United States Patent [19]
Anglerot et al.

[11] Patent Number: 6,146,613
[45] Date of Patent: Nov. 14, 2000

[54] METHOD OF ZEOLITE SYNTHESIS WITH HOMOGENEOUS SHAKING OUT OF THE MEDIUM, DEVICE AND APPLICATION

[75] Inventors: Didier Anglerot, Billiere; Jacques Bousquet, Irigny; Francesco Di Renzo, Montpelier; Jean-Paul Klein, Communay; Philippe Schulz, Sainte Foix les Lyon; Christine Bebon, Vaulz en Velin; Didier Colson, Pusignan, all of France

[73] Assignee: Elf Aquitaine, Courbevoie, France

[21] Appl. No.: 09/214,644

[22] PCT Filed: Jul. 11, 1997

[86] PCT No.: PCT/FR97/01276

§ 371 Date: Apr. 5, 1999

§ 102(e) Date: Apr. 5, 1999

[87] PCT Pub. No.: WO98/02384

PCT Pub. Date: Jan. 22, 1998

[30] Foreign Application Priority Data

Jul. 12, 1996 [FR] France .................. 96 08780

[51] Int. Cl.$^7$ .......................... C01B 39/02; C01B 39/04; C01B 39/20; B01F 7/24
[52] U.S. Cl. .................. 423/700; 423/702; 423/705; 423/711; 423/DIG. 21; 423/DIG. 26; 422/226; 422/227; 422/228; 366/266; 366/318
[58] Field of Search .................... 423/700, 702, 423/705, 711, DIG. 21, DIG. 26; 366/266, 318; 422/225, 226, 227, 228

[56] References Cited

U.S. PATENT DOCUMENTS

| | | |
|---|---|---|
| 4,091,007 | 5/1978 | Dwyer et al. . |
| 4,371,510 | 2/1983 | Christophliemk et al. . |
| 4,374,093 | 2/1983 | Rollmann et al. . |
| 5,188,808 | 2/1993 | Liljia et al. . |
| 5,928,623 | 7/1999 | Plee et al. ................ 423/711 |

FOREIGN PATENT DOCUMENTS

| | | |
|---|---|---|
| 364 352 | 4/1990 | European Pat. Off. . |
| 419 307 | 3/1991 | European Pat. Off. . |
| 1581919 | 9/1969 | France . |
| 1115791 | 9/1984 | U.S.S.R. . |
| 1404163 | 8/1975 | United Kingdom . |
| 2715890 | 12/1986 | United Kingdom . |
| 87/00158 | 1/1987 | WIPO . |

*Primary Examiner*—C. Melissa Koslow
*Assistant Examiner*—David Sample
*Attorney, Agent, or Firm*—Burgess, Ryan & Wayne

[57] ABSTRACT

A method is provided for zeolite synthesis from a synthesis medium containing in particular a trivalent aluminum source, a tetravalent silicon source, at least an alkaline or alkaline-earth cation in hydroxide form and water in a reactor containing a solid helical moving body in a guiding tube defining an internal space and a space external to the tube. The invention is characterized in that the synthesis medium is circulated in the reactor in a continuous flow passing through the internal space then the space external to the tube and returning to the internal space, only driven by the roation of the solid helical moving body, at a speed of less than 500 rpm, in the tube which is kept fixed, the synthesis medium being kept at a temperature suitable for at least one of the ripening operations or the crystal growth of the synthesized zeolite. The invention also is directed to a device for implementing the method.

19 Claims, 3 Drawing Sheets

METHOD OF ZEOLITE SYNTHESIS WITH HOMOGENEOUS SHAKING OUT OF THE MEDIUM, DEVICE AND APPLICATION

BACKGROUND OF THE INVENTION

1. Field of the Invention

The present invention relates to a process for zeolite synthesis and to a device for implementing it. The present invention relates more particularly to the synthesis of zeolites of all kinds in a stirred medium with a view to improving the manner of formation of the zeolite crystals and their quality.

2. Background of the Art

To obtain zeolites, it is usual to form so-called crystallizing solutions or gels containing a source of trivalent aluminium, a source of tetravalent silicon, at least one alkali or alkaline-earth metal cation in hydroxide form, water and optionally an organic structuring agent. However, from these constituents it is possible to obtain quite different zeolites, such as offretite (OFF), mazzite (MAZ) or zeolite L (LTL) (S. Ernst and J. Weitkamp; Catalysis Today 19, 1994, 27–60) by varying their distribution or the subsequent hydrothermal treatment needed for the crystallization, or else the stirring of the medium.

Other syntheses are obtained from gels into which natural or synthetic crystalline aluminosilicates or even crystals of zeolites are introduced as replacement for amorphous sources of aluminium. Such substitutions have made it possible to obtain a homogeneous growth of the crystals of target zeolites, regardless of whether this is done in an unstirred medium or a stirred medium, because of the slow and uniform dissolution of these aluminosilicates or of these crystals of source zeolite in the synthesis medium. It has thus been possible to synthesize zeolites of mazzite type (Dwyer, U.S. Pat. No. 4,091,007, Fajula, U.S. Pat. No. 4,891,200, Cannan, U.S. Pat. No. 4,840,779 and Di Renzo, FR 2,651, 221).

The prior art is rich in examples which show that small variations in the composition of the synthesis gel or in the crystallization conditions can result in the synthesis of zeolites which are very different in kind or even of amorphous compounds. Another factor which affects the growth of the crystals is the stirring (or the absence of stirring) of the synthesis medium, independently of the composition of the crystallizing solution or gel. Thus, in order to obtain a large number of zeolites, a person skilled in the art advises strongly against the use of stirrers during the crystallization of the zeolite, both during the maturing stage and during the crystal nucleation stage. It has been ascertained that, depending on the composition of the crystallizing solution or gel, it is possible to see appearing either a mixture of faujasite and of gmelinite in a static medium, or of zeolite P in a medium stirred with an anchor stirrer (D. E. W. Vaughan, Chem. Engin. Progress, 84(2), 1988, pp 25–31). In fact, the high shear rate generated by the stirrer localized only in a portion of the synthesis medium considerably modifies the process of germination and of growth of the crystals of zeolites and their nature, even if the initial composition of the gel is the same. In parallel, in the case of zeolites which are usually prepared in a stirred medium, like, for example, faujasite, a lowering has been noted in the crystallinity of the faujasite obtained when the stirrer speed and hence the local shear are increased (R. M. Barrer, Hydrothermal Chemistry of Zeolites, Academic Press, 1982, p. 171).

It is for the abovementioned reasons that many syntheses of zeolites are carried out statically, that is to say without stirring, because this promotes the slow growth of the crystals and the appearance and stabilization of zeolite phases which are thermodynamically not very stable. Moreover, it has not yet been possible to reproduce synthetically many natural zeolites in the pure state or as by-products of synthesis of other zeolites, regardless of whether this is in a stirred medium or a static medium.

Furthermore, it is well known to the manufacturers of zeolites that the transposition of some syntheses to an industrial scale is difficult or even impossible. It often results in low zeolite yields and in degrees of crystallinity which are much lower than those generally obtained on the laboratory scale (D. W. Breck, Zeolite Molecular Sieves, John Wiley and Sons, 1974, p. 725–731).

For the above reasons it is impossible to synthesize zeolites by processes that combine two types of stirring including anchor stirring and stirring by means of a propeller placed in a cylinder in perpetual motion, as proposed in patent U.S. Pat. No. 1,115,791, since these stirring actions induce strong variations in shear at the anchor and the edges of the cylinder in motion, which do not promote the maturing and the stabilization of the crystal phases.

The present invention is therefore aimed at a process for zeolite synthesis which makes it possible to stabilize more easily some zeolite phases that are highly unstable, even in static operation, to improve the quantitative yields of synthesis in relation to those obtained in a static or conventional stirred medium while shortening the synthesis time by virtue of better control of the transfers of matter and of heat in the synthesis gel or solution, and thus greatly to increase the degree of crystallinity of the zeolites. In addition, the process aimed at can be easily transposed to an industrial scale.

SUMMARY OF THE INVENTION

The subject matter of the present invention is therefore a process for the synthesis of a zeolite from a synthesis medium containing especially a source of trivalent aluminium, a source of tetravalent silicon, at least one alkali or alkaline-earth metal cation in hydroxide form and water, performed in a reactor containing a solid helical rotor in a guide tube defining a space which is internal and a space which is external to the said tube, characterized in that the said synthesis medium is circulated in the reactor as a continuous flow moving through the space which is internal and then the space which is external to the said tube and returning to the internal space, solely by the rotation of the solid helical rotor, at a speed lower than 500 rev/min, in the said tube held stationary, the synthesis medium being maintained at a temperature for carrying out at least one of the operations of maturing or of crystal growth of the zeolite to be synthesized.

The circulation of the said synthesis medium is ensured by the continuous or noncontinuous driving in rotation of the solid helical rotor. It is obvious that it is also possible to cause the medium to circulate by means of a number of solid helical rotors, each being driven in rotation in a guide tube held stationary in the reactor.

DESCRIPTION OF THE PREFERRED EMBODIMENT

The dimensional characteristics and the speed of rotation of the solid rotor are adapted to the synthesis medium, especially to its viscosity, in order to establish a nonturbulent flow regime in the reactor, that is to say a laminar or intermediate flow regime corresponding to a stirring Reynolds number lower than 25,000 (see the collection entitled Mixing by Nagata, Wiley, 1975). The speed of rotation of the helical rotor of 500 revolutions/min corresponds to the maximum shear rate tolerated in order to obtain a laminar or intermediate flow regime in gels for the synthesis of zeolites.

In the course of the syntheses of zeolites in static medium, seeds appear randomly in the synthesis medium, that is to say in places which are unpredictable and at various times, and this produces crystal size distributions which are broad and not very reproducible and results in the presence of a number of intermediate crystalline or amorphous phases. In a conventional stirred medium the medium has a shear rate which is variable and often high in the region of stirring and virtually nil in comparison outside the stirrer zone, and this interferes with homogeneous germination. With the present invention the medium is made homogeneous by the controlled stirring of the medium, that is to say by setting all of the medium in motion in the guide tube(s) and outside thereof. A consequence of this homogeneous flow is that shear rates, temperatures and compositions are obtained which are virtually identical at all points, resulting in an equal chance of obtaining an identical germination process at the same time, which cannot be obtained using conventional stirring processes or even in a static medium.

Also, besides the use of a solid helical rotor in order to make the synthesis medium circulate without perturbing the flow regime and hence without appreciably varying its shear rate, the guide tube includes at least one orifice in its lower part the shape of which has appreciably only a small influence on the shearing of the gel. An orifice is here intended to mean the space between the lower end of the guide tube and the bottom of the reactor or a plurality of holes cut out in the lower end of the guide tube resting in the bottom of the reactor. It is easy for a person skilled in the art to give any desired shape to these holes, as their edges must not promote the nucleation of undesirable zeolite seeds, that is to say a heterogeneous nucleation.

Within the scope of the present invention the axis of at least one helical rotor coincides with the axis of the reactor and that of the guide tube which contains it.

In a preferred embodiment of the invention the helical rotor is inscribed within a cylinder of revolution such that the ratio of the diameter of this said cylinder of revolution to the diameter of the guide tube which contains it varies from 0.4 to 0.99, and such that the ratio of the diameter of this cylinder of revolution to the diameter of the reactor varies from 0.3 to 0.9.

In addition, in the reactor, the height of the guide tubes is chosen such that it is smaller than that of the reactor, but preferably such that the ratio of the height of the said guide tube to the height to which the reactor is filled by the synthesis gel or solution is smaller than or equal to 0.95.

To implement the process according to the invention, the solid helical rotor necessary for circulating the synthesis medium in the reactor will be chosen from the group consisting of an Archimedes' screw, twisted bands or any other solid rotor which has at its periphery at least one external ridge exhibiting a helical shape over the whole of its length, capable of establishing a nonturbulent flow regime, by driving in rotation. The preferred rotor of the invention is an Archimedes' screw driven in a rotary motion by means of a motor.

The use of an Archimedes' screw in the case of which there is no pitch limit makes it possible to ensure not only a homogeneous flow in the reactor at virtually constant shear, but also permits an immediate transposition of the process of the invention to any scale and chiefly to an industrial scale.

In order to make use of the process of the invention, the ratio of the speeds of the flows in opposite directions inside and outside each guide tube varies between 0.5 and 2.

In a particular embodiment of the invention the synthesis medium passes through a succession of reactors arranged in series or in parallel and connected together, the gel recirculating in each reactor before being directed towards the next reactor. With this particular embodiment the stages of nucleation and of growth or of maturing of the gel, and its crystallization, can be separated.

Another subject matter of the present invention is a device for making use of the process of the invention, shown in FIG. 1, which is characterized in that it consists of at least one open or closed reactor (1) containing a cylindrical guide tube (5), stationary in relation to the reactor, with axis parallel to the walls of the reactor, comprising at least one orifice in its lower part, this guide tube containing a solid helical rotor (6) inscribed within a cylinder of revolution of diameter varying from 0.3 to 0.9 times the diameter of the reactor and from 0.4 to 0.99 times the diameter of the guide tube, this said rotor being driven in rotation by a motor (8), external to the reactor, the said reactor including conduits (4) for injection of the compounds forming part of the constitution of the gel, and optionally a device for draining (2).

In a preferred form of the invention the guide tube containing the helical rotor is placed on the axis of the reactor. It would not constitute a departure from the scope of the invention if several parallel guide tubes were installed, each containing a solid helical rotor, one of which may be placed on the axis of the reactor.

In a reactor of the device of the invention the guide tube does not occupy the whole height of the reactor; however, the ratio of the height of the guide tube to the height of filling of the reactor is preferably kept lower than 0.95.

Among the solid rotors applicable to the present invention there are to be found rotors of the group consisting of the Archimedes' screw, helical bands and any solid rotor which has at its periphery at least one external ridge exhibiting a helical shape over the whole of its length. The preferred rotor is an Archimedes' screw which is driven in rotation by means of a motor placed on its axis, its speed of rotation being preferably lower than 500 revolutions per minute. Any screw pitches are allowed for the Archimedes' screws within the scope of the invention.

The device of the invention may consist of a single open or closed reactor of autoclave type including at least one guide tube containing a helical rotor and capable of operating under pressure or open to the atmosphere.

In another embodiment of the device the latter may consist of a plurality of reactors placed in series, each containing a single guide tube equipped with an Archimedes' screw connected to a motor and optionally including at its base a device for shutting/draining the reactor. The Archimedes' screws may all be identical or different, may rotate at the same speed or otherwise and may be coupled to the same motor or otherwise.

These devices according to the invention facilitate industrial extrapolation, but they also make it possible to work at lower crystallization temperatures permitting the synthesis of zeolites at atmospheric pressure, in contrast to the known prior art.

The present invention also relates to the application of the process and of the device according to the invention to the synthesis in a medium stirred at constant shear of zeolites such as EMO, EMT, gmelinite and mazzite.

The understanding of the process and of the device of the invention will become clearer in the light of the figures described below.

BRIEF DESCRIPTION OF THE DRAWINGS

In FIG. 1 the reactor (1) is shown in the form of an autoclave which can operate at atmospheric pressure or under pressure, including a cylindrical body (1a) equipped with a device for draining (2) and a lid (1b). This lid (1b) is pierced with an orifice (3) and with conduits (4) for delivery of the constituents forming part of the composition of the synthesis solutions or gels. A guide tube of cylindrical shape (5) is fixed by any means inside the body of the reactor (1a); its axis coincides with that of the reactor (1). It contains an Archimedes' screw (6) whose axis of revolution coincides with the above two axes. The extension (7) of the said screw (6) passes through the lid (1b) through the orifice (3) and is connected to a motor (8) which can turn the said screw (6) about itself.

In FIG. 2 a reactor (1) is placed, including, as in FIG. 1, a lid (1b) but this time pierced with a number of orifices (3) (three are shown) and including a number of conduits for delivery of the components of the synthesis gel, and a body (1a) including a device for draining (2). The reactor contains at least three guide tubes (5a, 5b and 5c), each containing an Archimedes' screw (6a, 6b and 6c), the axis of the screw (6b) coinciding with those of the guide tube (5b) and of the reactor body (1a). The three screws (6a, 6b and 6c) are joined to three motors (8a, 8b and 8c) by the extensions (7a, 7b and 7c) passing through the orifices (3) in the lid (1b).

FIG. 3 shows a series of reactors (10) placed in series and connected to one another, exhibiting at the base the form of a venturi (11) the orifice of which is equipped with a shutting/draining device (12) capable of shutting the said venturi (11) and placed at the bottom of the reactor (10). Each reactor (10) is equipped with a guide tube (13), each containing an Archimedes' screw (14). All these screws (14) of identical or different pitches, are either connected together and coupled to the same motor (15) placed at the head of the first reactor (10a), or connected to different motors which are not shown in the figure, enabling these screws (14) to be driven in rotation but at different speeds. The first reactor (10a) has conduits (16) for delivery of the necessary components of the gel. Such conduits could also be present at the heads of the other reactors (10b), . . . (10i). At the bottom of the reactor (10i) a conduit (17) makes it possible to recover the crystallized gel which is entrained towards the units for separation and subsequent treatment of the crystals. The partial or complete closure of the shutting/draining devices (12) makes it possible to provide partial or complete recirculation of the synthesis gels in each reactor (10).

Figure 1:
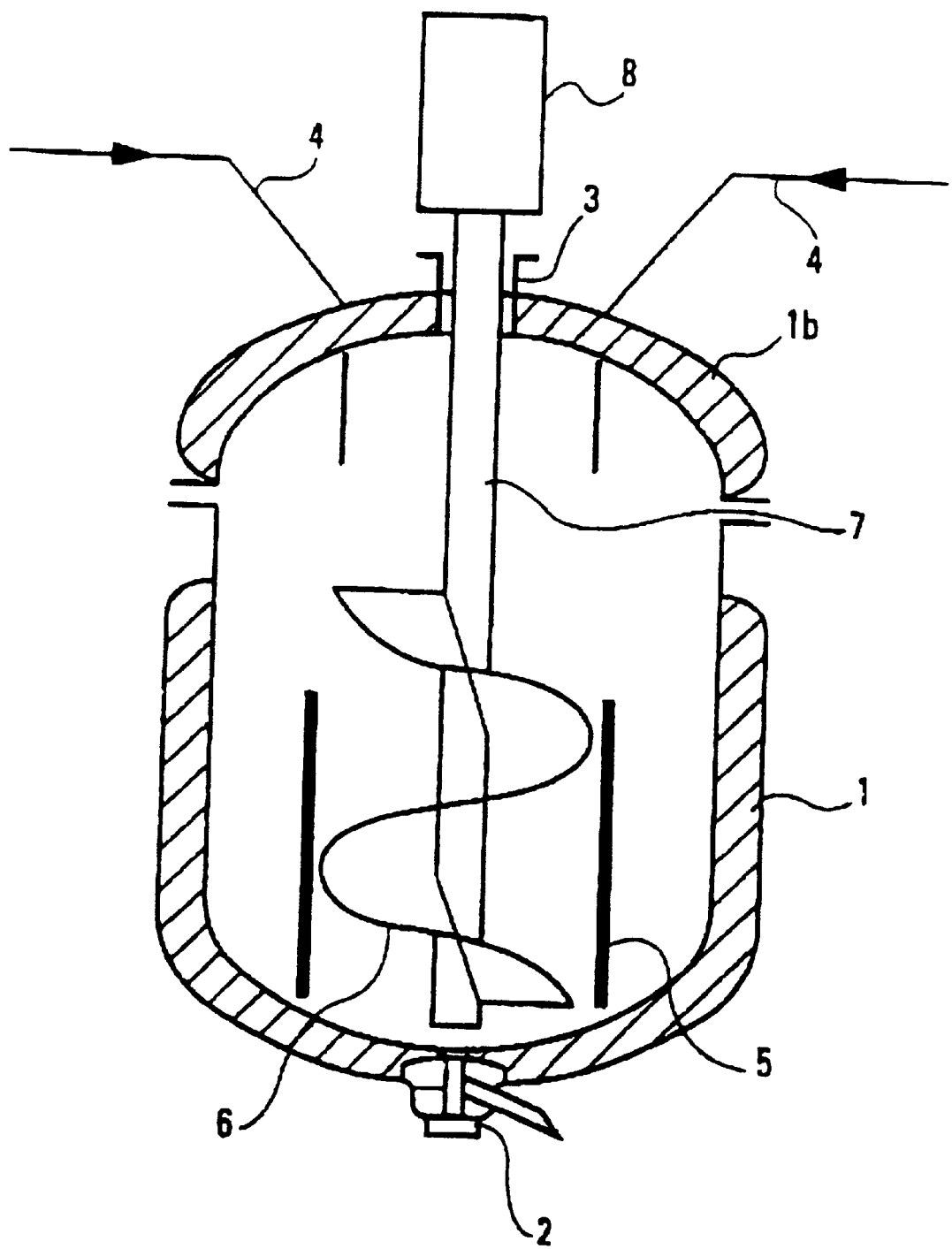
FIG. 1 shows, in section, a device for noncontinuous zeolite synthesis.
Figure 2:
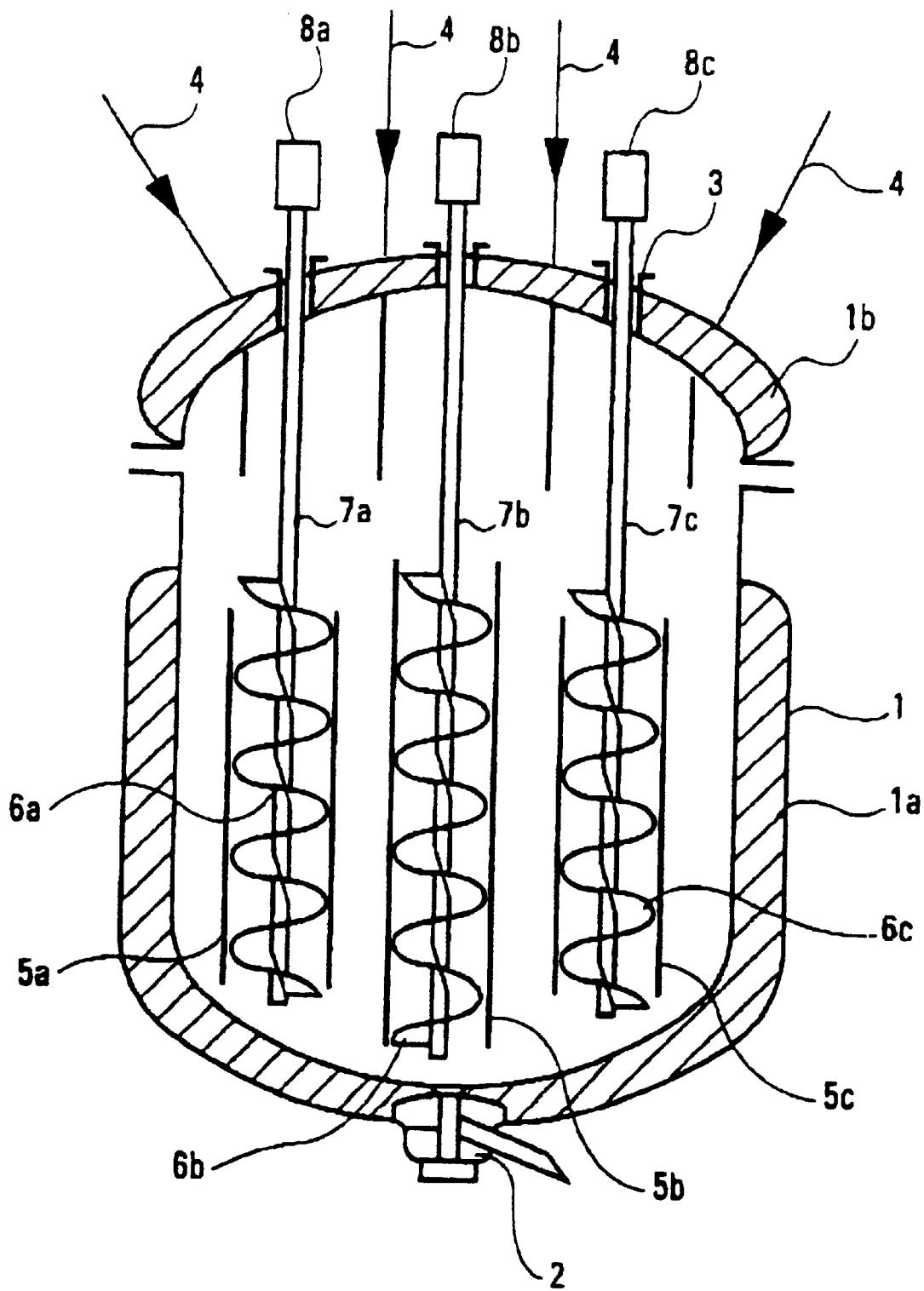
FIG. 2 shows, in section, a second device for noncontinuous synthesis.
Figure 3:
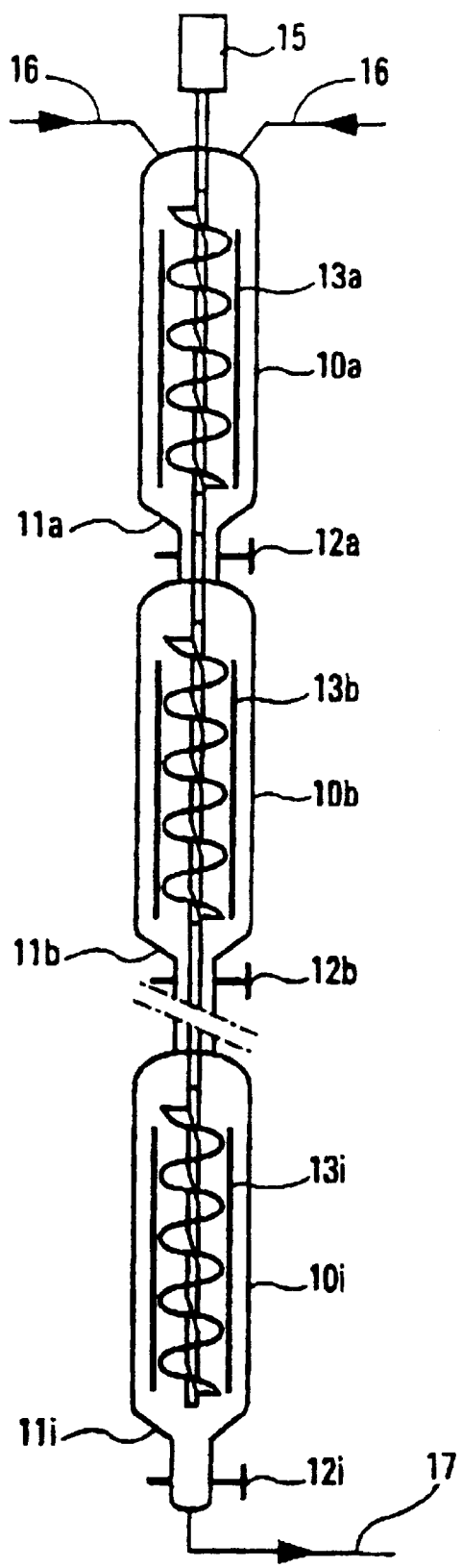
FIG. 3 shows the section of a device for continuous synthesis of zeolite.

Examples are given below, without any limitation being implied, to show the effectiveness of the process and of the device according to the invention. All the zeolites prepared hereinafter are designated by their reference name, published in the "Atlas of Zeolite Structure Types", third revised edition, Butterworth and Heinemann, London, 1992.

EXAMPLE I

This example aims to show the superiority of the process of the invention and of the corresponding device for the preparation of EMO.

For this purpose several samples are prepared of the same gel for synthesis of zeolite of faujasite structure of Si/Al ratio >3.5 in the presence of crown ether "15-Crown-5" or 15-C-5, on the one hand using the conventional process in static medium in an autoclave and, on the other hand, in a stirred medium either according to the invention or by means of a conventional anchor-type stirrer. The gels thus prepared are of stoichiometry identical with:

10 $SiO_2$, $Al_2O_3$, 2.1 $Na_2O$, 0.4 15-C-5, 100 $H_2O$.

The operation is carried out by introducing successively into a reactor of 2 l capacity, in the case of each of the samples, at:

t=0, 831.6 g of demineralized water
t=15 min, 84.4 g of 15-C-5
t=45 min, 77.5 g of NaOH
t=75 min, 170.8 g of $NaAlO_2$
t=105 min, 1406.3 g of Ludox AS 40 colloidal silica marketed by DuPont de Nemours.

The reactor temperature is maintained at at least 100° C. throughout the period of formation of the gel and then for some time longer for the formation of the EMO crystals.

Table I below shows the crystallinity characteristics of the EMO crystals obtained, as a function of the stirring of the synthesis medium, of the gel temperature and of the gel maturing period. Within the scope of the process according to the invention an Archimedes' screw is employed, of pitch equal to 81 mm, of diameter equal to 81 mm, in a cylinder of 89 mm diameter, in an autoclave of diameter equal to 150 mm. The screw is driven in rotation at 250 revolutions/min.

TABLE I

| Sample | type of synthesis | v (rev/min) | τ ($s^{-1}$) | crystallization T (° C.) | crystallization t (days) | crystallinity | crystal size |
|---|---|---|---|---|---|---|---|
| EMO 1 | static | — | 0 | 110 | 12 | 100 | 1–2 |
| EMO 2 | static | — | 0 | 110 | 5 | amorphous | |
| EMO 3 | static | — | 0 | 100 | 5 | amorphous | |
| EMO 4 | stirred/anchor | 200 | het. 67 | 110 | 5 | amorphous | |
| EMO 5 | stirred/Archimedes' screw | 250 | homo. 54 | 100 | 5 | 100 | 0.5 |
| EMO 6 | stirred/Archimedes' screw | 250 | homo. 54 | 90 | 11 | 130 | 0.5 |

*v = speed of rotation of the stirrer.
*τ = shear rate of the stirrer.
*het. = shear rate very different near the anchor and in the remainder of the solution.
*homo. = shear rate gradient close to 0.
*crystallinity measured by X-ray diffraction.

The three faujasites (FAU) obtained, EMO 1, EMO 5 and EMO 6 are identical in chemical composition.

It is found, according to this table, that in a static regime a crystallization temperature of 110° C. and a crystallization period of 12 days are needed to obtain EMO in which the crystal size is from 1 to 2 μm (EMO 1), whereas only 5 days are needed for crystallizing according to the process of the invention at 100° C. EMO in the form of small crystals (0.5 μm—EMO 5). The other tests reported show that it is impossible to crystallize EMO statically in less than 12 days or at a temperature of 100° C., even in a medium stirred by means of an anchor-type stirrer driven in rotation at 200 revolutions/min and at a high shear rate (EMO 2, EMO 3 and EMO 4).

This example therefore emphasizes that the synthesis in a stirred medium according to the invention results in shorter crystallization periods (EMO 5) with at least the same, if not better, quality of crystals of FAU obtained (crystal size), which makes it possible to lower the crystallization temperature (EMO 6) and to work at atmospheric pressure.

EXAMPLE II

This example aims to show the superiority of the process of the invention and of the corresponding device for the preparation of EMT.

For this purpose several samples are prepared of the same gel for synthesis of zeolite of faujasite structure of Si/Al ratio >3.5 in the presence of crown ether "18-Crown-6" or 18-C-6, on the one hand by the conventional process in a static medium in an autoclave and, on the other hand, in a medium stirred either according to the invention or by means of a conventional anchor-type stirrer. The gels thus prepared are of identical stoichiometry:

10 $SiO_2$, $Al_2O_3$, 2.1 $Na_2O$, 0.4 18-C-6, 100 $H_2O$.

The operation is carried out by introducing successively into a reactor of 2 l capacity, for each of the samples, at:

t=0, 831.6 g of demineralized water t=15 min, 84.4 g of 18-C-6 t=45 min, 77.5 g of NaOH t=75 min, 170.8 g of $NaAlO_2$ t=105 min, 1406.3 g of Ludox AS 40 colloidal silica marketed by DuPont de Nemours.

The reactor temperature is maintained at at least 100° C. throughout the period of formation of the gel and then for some time longer for the formation of the EMT crystals.

Table II below shows the crystallinity characteristics of the EMT crystals obtained, as a function of the stirring of the synthesis medium, of the gel temperature and of the gel maturing period. In the case of the samples according to the invention the operation is carried out in a device identical with that described in Example I in identical operating conditions.

TABLE II

| Sample | type of synthesis | v (rev/ min) | τ ($s^{-1}$) | crystallization T (° C.) | crystallization t (days) | crystallinity | crystal size |
|---|---|---|---|---|---|---|---|
| EMT 1 | static | — | 0 | 110 | 12 | 100 | 1–2 |
| EMT 2 | static | — | 0 | 110 | 5 | amorphous | |
| EMT 3 | static | — | 0 | 100 | 5 | amorphous | |
| EMT 4 | stirred/ anchor | 200 | het. 67 | 110 | 5 | amorphous | |
| EMT 5 | stirred/ Archimedes' screw | 250 | homo. 54 | 100 | 7 | 100 | 0.5 |

*v = speed of rotation of the stirrer.
*τ = shear rate of the stirrer.
*het. = shear rate very different near the anchor and in the remainder of the solution.
*homo. = shear rate gradient close to 0.
*crystallinity measured by X-ray diffraction.

The two faujasites (FAU) obtained, EMT 1 and EMT 5 are identical in chemical composition.

It is found, according to this table, that, as in the case of Example I, the crystallization takes place in conditions which are more favourable than those employed by a person skilled in the art, that an at least identical, if not better, EMT crystallinity is obtained and that it is possible to work more quickly at lower temperatures, even at atmospheric pressure.

EXAMPLE III

This example aims to show the superiority of the process of the invention and of the corresponding device for the preparation of mazzite.

Several samples are prepared of the same synthesis gel of following stoichiometry:

5.3 $Na_2O$, $Al_2O_3$, 0.3 $TMA_2O$, 15 $SiO_2$, 270 $H_2O$

The various gel samples are prepared with stirring which is either mechanical, at approximately 150 revolutions/minute by means of an anchor-type stirrer, or according to the process according to the invention by means of an Archimedes' screw of pitch equal to 81 mm, of diameter equal to 81 mm in a guide tube of 89 mm diameter, rotating at a speed of 250 rev/min. The samples are kept at ambient temperature throughout the period of introduction of the components of the gel.

Thus, for each sample, 1902.3 g of demineralized water in which 150.6 g of sodium hydroxide and then 26.2 g of tetramethylammonium TMACl are dissolved gradually are introduced into a reactor of 2 l capacity. To this solution are gradually added 333.9 g of Zeosil 1165 MP marketed by Rhône Poulenc, forming the source of silica of the zeolite, and then stirring is maintained for one hour. The source of aluminium, in this case consisting of 130.9 g of siliporite NaX marketed by CECA is added next and then the stirring is maintained for two hours. The temperature of the gel is next raised to 115° C. in the case of MAZ 1 and MAZ 2 or to 100° C. in the case of MAZ 3, and then maintained at these values.

According to the conventional synthesis the gel is stirred with an anchor stirrer rotating at 150 rev/min, at autogenous pressure, until the mazzite crystallizes. According to the process of the invention the gel is stirred at atmospheric pressure.

The conditions of synthesis and of crystallization and the crystallinity of the zeolites obtained for each sample are collated in Table III below.

TABLE III

| Sample | type of synthesis | v (rev/ min) | τ ($s^{-1}$) | crystallization T (° C.) | crystallization t (days) | crystallinity (%) |
|---|---|---|---|---|---|---|
| MAZ 1 | stirred/ anchor | 150 | het. 50 | 115 | 40 | 100 MAZ |
| MAZ 2 | stirred/ anchor | 15.0 | het. 50 | 115 | 26 | amorphous + MAZ |
| MAZ 3 | stirred/ Archimedes' screw | 250 | homo. 54 | 100 | 26 | 100 MAZ |

*v = speed of rotation of the stirrer.
*τ = shear rate of the stirrer.
*het. = shear rate very different near the anchor and in the remainder of the solution.
*homo. = shear rate gradient close to 0.
*crystallinity measured by X-ray diffraction.

It is found, according to this table, that the synthesis of mazzite with 100% crystallinity in anchor-type stirred medium is less fast than that carried out according to the process of the invention at a temperature which is 15° C. lower.

EXAMPLE IV

This example is aimed at showing the superiority of the process of the invention and of the corresponding device for the preparation of gmelinite, compared with the traditional processes of synthesis in a static regime or in a medium stirred at a high shear rate.

Several samples are prepared of the same synthesis gel obtained by proceeding as follows:

Into a reactor 2 liters in capacity are introduced, at, t=0, 1164.4 g of demineralized water, t=15 min, 136 g of PEO (polyethylene oxide of average molecular weight of 3400 g/mol), marketed by Aldrich, t=45 min, 77.5 g of sodium hydroxide, t=75 min, 170.8 g of $NaAlO_2$, t=105 min, 1406.8 g of Ludox AS 40 colloidal silica marketed by DuPont de Nemours.

The gel thus prepared has the following stoichiometry:

10 $SiO_2$, $Al_2O_3$, 2.1 $Na_2O$, 0.04 PEO, 140 $H_2O$.

The results of the syntheses are given in Table V below.

TABLE V

| Sample | type of synthesis | v (rev/min) | τ ($s^{-1}$) | T (° C.) | crystallization t (days) | crystal phases |
|---|---|---|---|---|---|---|
| GME 1 | static | — | 0 | 100 | 6 | amorphous + FAU |
| GME 2 | static | — | 0 | 100 | 12 | FAU + εGME |
| GME 3 | stirred/ Archimedes' screw | 150 | homo. 1950 | 100 | 6 | 100 GME |
| GME 4 | stirred/ Archimedes' screw | 350 | homo. 4650 | 100 | 5 | 100 GME |
| GME 5 | stirred/ anchor | 180 | het. 3600 | 100 | 5 | amorphous + FAU |
| GME 6 | stirred/ anchor | 180 | het. 3600 | 100 | 12 | FAU + GME |

*v = speed of rotation of the stirrer.
*τ = shear rate of the stirrer.
*het. = shear rate very different near the anchor and in the remainder of the solution.
*homo. = shear rate gradient close to 0.

It is found that the synthesis in a static medium, regardless of the crystallization period (up to 12 days) does not result in a pure gmelinite phase (GME). The synthesis according to the invention, in different shear conditions (150 and 350 revolutions/min) results in any case in a pure gmelinite phase, whereas the synthesis in an anchor-type conventional stirred medium produces a mixture of gmelinite and of faujasite (predominant).

Furthermore, it was found that the pure GME obtained had an ovoid morphology with a crystal size larger than 1 μm.

What is claimed is:

1. A process for the synthesis of a zeolite from a synthesis medium containing a source of trivalent aluminum, a source of tetravalent silicon, at least one alkali or alkaline-earth metal cation in hydroxide form and water, comprising maintaining said synthesis medium at a maturing temperature or crystallizing temperature in a reactor containing a solid helical rotor in a guide tube defining a space which is internal and a space which is external to the said tube, wherein said synthesis medium is circulated in the reactor as a continuous flow moving through the space which is internal and then the space which is external to said tube and returning to the internal space, solely by the rotation of the solid helical rotor, at a speed lower than 500 rev/min, in said guide tube held stationary.

2. The process according to claim 1, wherein the circulation of said synthesis medium is ensured by the continuous or noncontinuous driving in rotation of the helical rotor.

3. The process according to claim 1, wherein the circulation of the medium corresponds to a nonturbulent flow regime.

4. The process according to claim 1, wherein the guide tube is provided with at least one orifice in its lower part allowing the synthesis medium to pass freely without perturbing the flow regime.

5. The process according to claim 1, wherein the axis of the rotor coincides with the axis of the guide tube which contains it and the axis of the reactor.

6. The process according to claim 1, wherein the helical rotor is inscribed within a cylinder of revolution such that the ratio of the diameter of the cylinder of revolution to the diameter of the guide tube varies from 0.4 to 0.99.

7. The process according to claim 1, wherein the helical rotor is inscribed within a cylinder of revolution such that the ratio of the diameter of the cylinder of revolution to the diameter of the reactor varies from 0.3 to 0.9.

8. The process according to claim 1, wherein the ratio of the height of the guide tube to the height of the reactor is [kept] smaller than equal to 0.95.

9. The process according to claim 1, wherein the helical rotor is selected from the group consisting of an Archimedes' screw, a twisted band or any other solid rotor which has at its periphery at least one external ridge exhibiting a helical shape over the whole of its length.

10. The process according to claim 9, wherein the helical rotor is an Archimedes' screw.

11. The process according to claim 10, wherein the ratio of the speeds of the flows in opposite directions inside and outside the guide tube varies between 0.5 and 2 in the reactor.

12. The process according to claim 11, which is carried out in a plurality of reactors placed in series or in parallel, connected together, the gel recirculating in each reactor before being directed to the next reactor.

13. A device for the synthesis of a zeolite of the process defined by claim 1, which consists of at least one open or closed reactor containing a cylindrical guide tube, stationary in relation to the reactor, with axis parallel to the walls of the reactor, comprising at least one orifice in its lower part, the guide tube containing a solid helical rotor inscribed within a cylinder of revolution of diameter varying from 0.3 to 0.9 times the diameter of the reactor and from 0.4 to 0.99 times the diameter of the guide tube, said rotor being driven in rotation by a motor, external to the reactor, said reactor additionally including conduits for injection of the compounds forming part of the reaction medium and optionally a device for draining.

14. The device according to claim 13, wherein the guide tube containing the helical rotor is placed on the axis of the reactor.

15. The device according to claim 13, wherein the ratio of the height of the guide tube to the height of filling of the reactor is lower than 0.95.

16. The device according to claim 13, wherein the helical rotor are selected from the group consisting of an Archimedes' screw, helical bands or any other solid rotor which has at its periphery at least one external ridge exhibiting a helical shape over the whole of its length.

17. The device according to claim 13, wherein the helical rotor is an Archimedes' screw which is driven in rotation by means of a motor placed on the axis of the Archimedes' screw, the speed of rotation of the Archimedes' screw being lower than 500 rev/min.

18. The device according to claim 13, wherein the device consists of a single autoclave reactor capable of operating under pressure or open to the atmosphere.

19. The device according to claim 13, wherein the device consists of a plurality of reactors placed in series, each containing a single guide tube equipped with an Archimedes' screw connected to a motor and optionally including at its base a device for shutting/draining the reactor, the Archimedes' screws being all identical or different, coupled to the same motor or otherwise rotating at the same speed or otherwise.

* * * * *